United States Patent [19]

Yamamoto

[11] Patent Number: 5,717,675
[45] Date of Patent: Feb. 10, 1998

[54] OPTICAL HEAD

[75] Inventor: Masakuni Yamamoto, Yamato, Japan

[73] Assignee: Canon Kabushiki Kaisha, Tokyo, Japan

[21] Appl. No.: 639,895

[22] Filed: Apr. 26, 1996

[30] Foreign Application Priority Data

May 11, 1995 [JP] Japan .................... 7-112912

[51] Int. Cl.$^6$ ........................ G11B 7/00
[52] U.S. Cl. ................ 369/110; 369/103; 369/112; 369/13
[58] Field of Search ................ 369/110, 103, 369/112, 111, 109, 44.12, 46.37, 13

[56] References Cited

U.S. PATENT DOCUMENTS

| | | | |
|---|---|---|---|
| 5,450,376 | 9/1995 | Matsumura et al. | 369/13 |
| 5,495,461 | 2/1996 | Komma et al. | 369/110 X |
| 5,519,685 | 5/1996 | Kato et al. | 369/110 |

FOREIGN PATENT DOCUMENTS

| | | |
|---|---|---|
| 5274733 | 10/1993 | Japan . |
| 7169129 | 7/1995 | Japan . |

*Primary Examiner*—Muhammad N. Edun
*Attorney, Agent, or Firm*—Fitzpatrick, Cella, Harper & Scinto

[57] ABSTRACT

An optical head of the present invention applies p-polarized light from a semiconductor laser chip to a magneto-optical disk in the form of a spot through a collimator lens and an objective. The optical head has a polarized-light separating hologram device for separating only an s-polarized light component from the reflected light. A hologram formed on the hologram device has two polarized-light separating surfaces divided by a line in the direction corresponding to the information track direction. Beams separated on the separating surfaces are guided to two information-reproducing photodetectors, respectively. A transparent cover of a semiconductor laser apparatus is provided with a separating hologram. A beam separated on the hologram is guided to a multi-division photodetector used for auto-focusing and auto-tracking operations. The information-reproducing photodetectors, the multi-division photodetector, and the semiconductor laser chip are formed on a common substrate. With this arrangement, a smaller and lighter optical head can be achieved.

15 Claims, 8 Drawing Sheets

PRIOR ART

OPTICAL HEAD

BACKGROUND OF THE INVENTION

1. Field of the Invention

The present invention relates to an optical head for reproducing information recorded on a magneto-optical recording medium.

2. Description of the Related Art

FIG. 1 is a schematic view of an optical head used in a conventional magneto-optical recording/reproducing apparatus. Referring to FIG. 1, a divergent beam emitted from a semiconductor laser 19 used as a light source is collimated by a collimator lens 20 and is formed into a collimated beam having a circular cross section by a beam-shaping prism 21. The beam is incident as p-polarized light on a polarized-beam splitter 22. The characteristics of the beam splitter 22 are, for example, 60% p-polarized light transmittance, 40% p-polarized light reflectivity, 0% s-polarized light transmittance, and 100% s-polarized light reflectivity. The p-polarized beam passing through the beam splitter 22 is converged by an objective 23 and forms a light beam spot on a magnetic layer of a magneto-optical disk 24 used as a magneto-optical recording medium. A magnetic field modulated according to a recording signal is applied to the light beam spot from the magnetic head 25, whereby information magnetic domains are recorded on the magnetic layer.

The reflected light from the magneto-optical disk 24 returns through the objective 23 to the polarized-beam splitter 22 in which the reflected light is partially separated to travel to a reproducing optical system 27. The beam impinging on the reproducing optical system 27 is further split into two components in a polarized-beam splitter 26. The characteristics of the beam splitter 26 are, for example, 20% p-polarized light transmittance, 80% p-polarized light reflectivity, 0% s-polarized light transmittance, and 100% s-polarized light reflectivity. The beam passing through the beam splitter 26 is guided through a condenser lens 35 to a beam splitter 36 and split into two components therein. One split component of the beam is guided to a photodetector 37 for detecting tracking errors, while the other component is guided to a photodetector 39 for detecting focusing errors through a knife edge 38. By these control optical systems (the photodetectors 37 and 39), error signals used for performing auto-tracking and auto-focusing on light beam spots are generated.

In the reproducing optical system 27, the beam reflected in the beam splitter 26 changes its polarizing direction to 45 degrees after passing through a ½-wave plate 28 and is then converged into a condenser lens 29, finally reaching a polarized-beam splitter 30. The characteristics of the beam splitter 30 are, for example, 100% p-polarized light transmittance, 0% p-polarized light reflectivity, 0% s-polarized light transmittance, and 100% s-polarized light reflectivity. The two components of the beam split in the beam splitter 30 are incident on photodetectors 31 and 32, respectively. Detection signals generated in the respective photodetectors 31 and 32 are differentially amplified in a differential amplifier 33, thus generating a reproducing signal 34.

When linear polarized light is applied to a magneto-optical recording medium on which information is recorded in the form of the orientations of the vertical magnetization, the polarizing direction of the light reflected from the recording medium is rotated clockwise or counterclockwise according to the orientation of the magnetization. For example, the polarizing direction of the linear polarized light impinging on the magneto-optical recording medium shall be determined to be in the direction indicated by the arrow P shown in FIG. 2. The reflected light when the magnetization of the recording medium faces downward changes its polarizing direction to be formed into the light $R_+$ by rotating by the angle $+\theta_K$, while reflected light when the magnetization of the recording medium faces upward changes its polarizing direction to be formed into the light $R_-$ by rotating by the angle $-\theta_K$. The direction of an analyzer is set, as indicated in FIG. 2, and then, a light component after passing through the analyzer from the reflected light $R_+$ can be indicated by A, while a light component after passing through the analyzer from the reflected light $R_-$ can be represented by B. Such light components are detected in the respective photodetectors so as to obtain information representing a difference in light intensity. In the example shown in FIG. 1, the polarized-beam splitter 30 doubles as an analyzer that is located at +45 degrees in the P direction as viewed from one component of the split beam and also at −45 degrees in the P direction as viewed from the other component. Hence, since the signal components obtained in the respective photodetectors 31 and 32 are 180 degrees out of phase, the signals are differentially amplified and detected, thereby making it possible to obtain a reproducing signal with reduced noise.

To achieve increased storage capacity, the mark-position recording method using the pitch between the central positions of information pits is being replaced by the mark-length recording method employing the lengths of information pits. The information recorded according to the mark-length recording method is conventionally reproduced by the following procedure. A signal from information pits, obtained optically by an optical head, is subjected to electrical processing, such as differentiation, and the edge portions of the pits are detected. In contrast, a reproducing method for directly detecting pit edges in an optical manner has been suggested (Japanese Patent Application No. 4-47789 (Japanese Patent Laid-Open No. 5-274733, and corresponding U.S. Pat. No. 012453, filing date: Feb. 2, 1993). This method will now be explained with reference to FIGS. 3 to 6.

FIG. 3 is a schematic view of an optical head used in this reproducing method. The elements having functions similar to those of the elements shown in FIG. 1 are designated by like reference numerals. The objective 23 whose numeral aperture (NA) is approximately 0.55 has a curved surface having a large degree of curvature. When linear polarized light is applied to the curved surface from the semiconductor laser 19, the plane of polarization slightly rotates in the respective positions of the curved surface in different directions. As a consequence, as viewed from the polarizing component in the direction orthogonal to the direction in which the linear polarized light is incident, a four-leaf-clover-shaped diffraction image can be obtained, as will be described below. A beam from the semiconductor laser 19, which is p-polarized light, passes through the objective 23 and is applied to the magneto-optical disk 24. The polarizing direction of the p-polarized beam is set to be parallel or perpendicular to the tracks of the magneto-optical disks 24.

When the beam incident on the disk 24 is reflected thereon, an s-polarized-light component is generated due to a magneto-optical effect, such as the Kerr effect or the Faraday effect. The reflected beam again passes through the objective 23 and is formed into a collimated beam. This collimated beam contains the s-polarized light generated on the curved surface of the objective 23, as well as the s-polarized light produced due to the magneto-optical effect.

The reflected beam from the disk 24 is partially reflected on the beam splitter 22 and is further guided to another beam splitter 40. The characteristics of the beam splitter 40 are, for example, 100% p-polarized light transmittance, 0% p-polarized light reflectivity, 0% s-polarized light transmittance, and 100% s-polarized light reflectivity. The p-polarized beam passes through the beam splitter 40 and is guided to the control optical systems (photodetectors 39 and 37) in which error signals for auto-focusing and auto-tracking are generated. The s-polarized beam is, on the other hand, reflected on the beam splitter 40 and is guided to a condenser lens 41 of the reproducing optical system 45. The split beam components are further detected on the respective detection surfaces of a two-way split photodetector 42. The detected signals are differentially amplified in a differential amplifier 43 so as to generate a reproducing signal 44. It should be noted that the split line of the photodetector 42 is arranged to be parallel to the tracks of the disk 24. The light impinging on the photodetector 42 contains the s-polarized beam generated due to the magneto-optical effect and the s-polarized beam produced on the curved surface of the objective 23.

As is seen from FIG. 2, the s-polarized beam generated due to the magneto-optical effect contains an $S_+$ beam component reflected on the disk 24 when the magnetization faces upward and an $S_-$ beam component reflected on the disk 24 when the magnetization faces downward, both the components being out of phase by $\pi$. More specifically, when a boundary (edge portion) between the magnetization facing upward and the magnetization facing downward is positioned within a light spot, optical diffraction occurs, in a manner similar to the case in which the light is reflected on an edge portion of a λ/4-depth pit. This will be explained below in greater detail. On the other hand, the s-polarized beam produced on the curved surface of the objective 23 will now be explained with reference to FIGS. 4A and 4B. In FIGS. 4A and 4B the s-polarized beam components are detected on the respective detection surfaces 42-1 and 42-2 of the photodetector 42. The arrow A indicates the information track direction optically corresponding to the photodetector 42. FIG. 4A illustrates the light distribution of the beam component $S_+$ generated by the magneto-optical effects, while FIG. 4B represents the light distribution of the s-polarized diffracted beam produced on the curved surface of the objective 23. More specifically, FIG. 4B illustrates the four-leaf clover-shaped distribution, each pair of portions of the beam component represented by opposing leaves are in phase with each other, while each pair of portions indicated by adjacent leaves are out of phase by $\pi$. This distribution shown in FIG. 4B appears on the photodetector 42 regardless of the orientation of the magnetization of the magneto-optical disk 24. FIGS. 5A and 5B illustrate the amplitudes of light waves along the lines B-B' and C-C' of FIG. 4B. FIG. 5A indicates the amplitude of the light along the line B-B', while FIG. 5B designates the amplitude of the light along the line C-C'.

A detailed explanation will further be given of the foregoing reproducing method with reference to FIGS. 6A through 6F. FIG. 6A indicates the relationship between the light beam spot used for the reproducing operation and the magnetic domain. FIG. 6A shows an information track 45 and a magnetic domain 46 recorded according to the magnetic-field modulation method. The recording operation may be performed according to the optical modulation method. The overall surface of the magneto-optical disk 24 was magnetized downward in the initializing state, and the magnetization of the magnetic domain 46 thus faces upward.

A light beam spot 47 scans in the direction A on the information track 45 in which the magnetic domain 46 has been recorded, as indicated by the order of 48, 49, 50 and 51 in FIG. 6A. FIG. 6B illustrates the distributions of the s-polarized beam generated by the magneto-optical effect located on the photodetector 42, corresponding to the respective positions 47 to 51 of the light spot shown in FIG. 6A. 42-1 and 42-2 designating the respective detection surfaces of the photodetectors 42. The orientations of the magnetization in the positions 47 and 51 of the spot are downward where light diffraction does not occur, whereby the distribution of the s-polarized light on the photodetector 42 is circular. The edge portions of the magnetic domain 46 that are magnetized upward and downward in a mixed manner are located in the positions 48 and 50 of the spot. This causes optical diffraction in the direction parallel to the track 45, thereby resulting in the distributions on the photodetector 42 as shown in FIG. 6B. The light distributions corresponding to the respective positions 48 and 50 of the beam spot are out of phase with each other by $\pi$, the phase relationship between the distributions being laterally reversed to each other. The orientation of the magnetization in the position of the beam spot 49 is almost entirely upward where substantially no optical diffraction occurs, whereby the light distribution can be indicated as shown in FIG. 6B. There is a phase difference by $\pi$ between the light distribution of the position 49 of the spot and that of the positions 47 and 51 of the spot.

FIG. 6C illustrates the optical amplitude along the line D-D' of FIG. 6B corresponding to each of the positions of the beam spot. FIGS. 6D and 6E illustrate the distributions of the light intensity as a result of causing the interference between the light distributions shown in FIG. 6B and the light distributions illustrated in FIG. 4B on the photodetector 42. FIG. 6D illustrates the intensity distribution along the line B-B' of FIG. 6B, while FIG. 6E designates the intensity distribution along the line C-C' of FIG. 6B. As is seen from FIGS. 6D and 6E, although the distribution on the photodetector 42 in each of the positions 47, 49 and 51 of the beam spot is laterally asymmetrical, it has the same light quantity on the detection surfaces 42-1 and 42-2. In contrast, although the distribution of the beam spot on the photodetector 42 in each of the positions 48 and 50 which overlaps with the edge portions of the magnetic domain 46 is laterally symmetrical, there is a difference in the light quantity on the detection surfaces 42-1 and 42-2. Accordingly, the outputs of the detection surfaces 42-1 and 42-2 are differentially amplified by the differential amplifier 43, thereby generating a reproducing signal shown in FIG. 6F. This signal indicates 0 in the positions 47, 49 and 51 of the beam spot having the same light quantity on the detection surfaces 42-1 and 42-2 and represents peaks in the positive and negative directions in the positions 48 and 50 of the spot, respectively, having different light quantity on the detection surfaces 42-1 and 42-2. Hence, the positions of the peaks in the positive and negative directions of the reproducing signal are detected, whereby the edge portions of the magnetic domain 46 can be directly detected. Additionally, the optical head, and in particular, the reproducing optical system, can be constructed somewhat more simply, as shown in FIG. 3.

As a technique for downsizing the optical head, the following type has been suggested, as illustrated in FIG. 7. Namely, error signals used for auto-focusing and auto-tracking operations are detected by a photodetector disposed within a semiconductor laser. Referring to FIG. 7, a light beam emitted from a semiconductor laser chip 53 passes through a cover 54 having a hologram and is guided to a recording medium. The light beam reflected on the recording medium passes through the same optical path and returns to a semiconductor laser 52. The returned beam is partially deflected on the hologram formed on the cover 54 and is further guided to a multiple-division photodetector 55. The hologram mounted on the cover 54 is formed of a plurality of regions having different grating frequencies, whereby the light beam is guided to the corresponding optical detection surfaces from the respective regions. With this arrangement, focusing-error signals are obtained according to the Foucault method, while tracking-error signals are detected according to the push-pull method.

The present inventor has suggested the following type of optical head in Japanese Patent Application No. 5-311513 (and corresponding U.S. Pat. No. 352227, filing date: Dec. 18, 1994). Light generated due to the magneto-optical effect of a magneto-optical recording medium is caused to interfere with light produced by diffracting a light beam on the curved surface of a lens used for forming the light applied to a recording medium into a spot. The interference light is detected in a photodetector, thereby reproducing recording information. In this optical head, a polarized-beam splitter is used as means for deflecting a light beam from a light source to a magneto-optical recording medium, and a detector for detecting error signals is contained in a semiconductor laser. An example of this type of optical head is shown in FIG. 8.

FIG. 8 shows a semiconductor laser 15 loaded with a function of detecting error signals, as has been explained with reference to FIG. 7. A light beam emitted from the semiconductor laser 15 is formed into a collimated beam after passing through a collimator lens 3 and is guided to a polarized-beam splitter 4. The light beam incident on the beam splitter 4 is linear polarized light having the plane of polarization slightly skewed with respect to the plane of polarization of the s-polarized light. The characteristics of the beam splitter 4 are, for example, 100% p-polarized light transmittance, 0% p-polarized light reflectivity, 0% s-polarized light transmittance, and 100% s-polarized light reflectivity. Since the linear polarized light collimated in the collimator 3 and entering the beam splitter 4 has the plane of polarization slightly rotated with respect to the s-polarized light as described above, a small amount of the partial p-polarized light component passes through the beam splitter 4 and is detected in a photodetector 5. The resulting detection signal is used for monitoring the output of the semiconductor laser 15. The remaining s-polarized component is mostly reflected on the beam splitter 4 and deflected at 90 degrees toward a magneto-optical disk 8. The deflected light beam is formed into a miniscule spot through an objective 6 and applied to an information track of the disk 8. Objective-driving coils 7 are used for performing auto-focusing and auto-tracking operations.

The reflected light from the disk 8 is again substantially formed into a collimated beam after passing through the objective 6 and returns to the beam splitter 4. As has been discussed with reference to FIGS. 3 to 6, the reflected light contains the p-polarized light generated due to the magneto-optical effect of the magneto-optical disk 8 and the p-polarized light diffracted on the curved surface of the objective 6. The p-polarized light having the above-mentioned two components passes through the beam splitter 4 and is then detected by a two-way split photodetector 9. The direction of the split line of the photodetector 9 optically corresponds to the information-track direction of the light-applying position of the disk 8. A reproducing method for magneto-optical information by the photodetector 9 is similar to that described with reference to FIGS. 3 to 6. The s-polarized light component of the reflected light from the disk 8 is reflected on the beam splitter 4 and returns to the semiconductor laser 15 through the collimator lens 3. Error signals for auto-focusing and auto-tracking operations are detected in the semiconductor laser 15, as has been discussed above.

In this manner, according to this example, in an optical head for reproducing recorded information according to a method in which four-leaf-clover-shaped light diffracted by an objective is used, a polarized-beam splitter is employed, and an error signal detector is disposed in a semiconductor laser, thereby simplifying the construction of a reproducing system.

However, there is a demand for further decreasing the size of an optical head of the above type.

SUMMARY OF THE INVENTION

Accordingly, in view of the above-described technical background, it is an object of the present invention to provide a smaller and lighter optical head for reproducing magneto-optical information.

In order to achieve the above object, according to the present invention, there is provided an optical head for applying a light beam from a light source to a magneto-optical recording medium in the form of a spot through an objective and, based on the light reflected from the recording medium, reproducing information recorded on the magneto-optical recording medium, the optical head comprising a polarized-light separating hologram device for separating a predetermined polarized-light component from the reflected light, wherein the light separated by the polarized-light separating hologram device is guided to an information reproducing photodetector for reproducing recorded information. The polarizing direction of the predetermined polarized-light component may be orthogonal to the polarizing direction of the light travelling to the objective from the light source.

The optical head may further comprise a separating hologram device for partially separating the reflected light, and a beam separated by the separating hologram device may be guided to a control signal photodetector for obtaining a light beam control signal. The control signal photodetector may be a photodetector for auto-focusing and auto-tracking operations. A light beam component passing through the polarized-light separating hologram device may be guided to the separating hologram device, the light beam component being part of the reflected light.

The information-reproducing photodetector may be disposed within a light source unit containing the light source. The information-reproducing photodetector may be formed on a common substrate on which the light source is mounted. The control signal photodetector may be disposed within a light source unit containing the light source. The control signal photodetector may be formed on a common substrate on which the light source is mounted. The light source unit containing the light source may comprise a transparent cover, and a light beam may travel to the objective from the light source through the transparent cover. One of the separating hologram device and the polarized-light separating hologram device may be formed on the transparent cover. The light source, the information-reproducing photodetector and the control signal photodetector may be located in such a manner that they are not in line with each other.

Further objects, features and advantages of the present invention will become apparent from the following description of the preferred embodiments with reference to the attached drawings.

DETAILED DESCRIPTION OF THE PREFERRED EMBODIMENT

Figure 1:
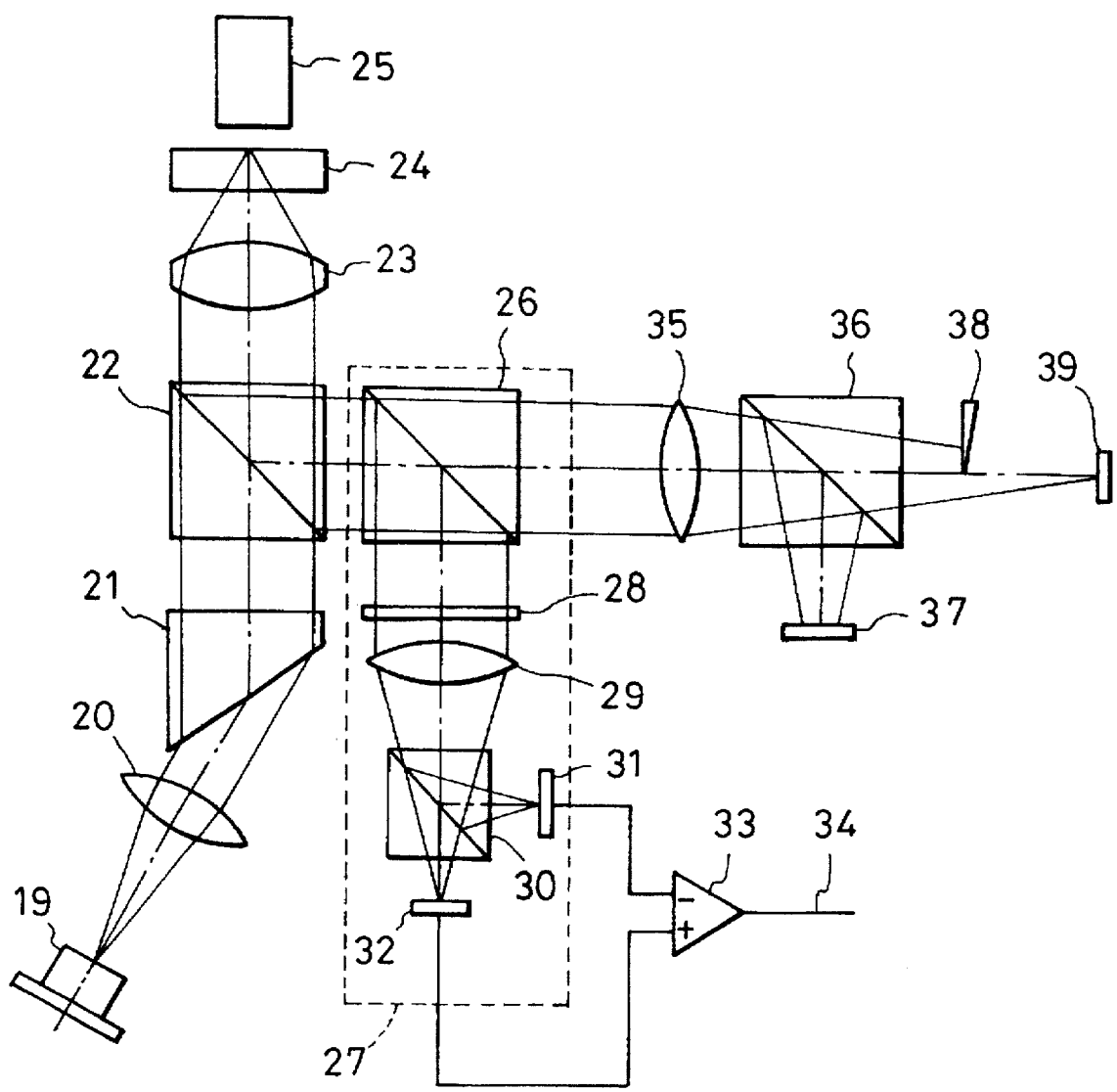
FIG. 1 is a schematic view of a conventional optical head for use in a magneto-optical recording/reproducing apparatus.
Figure 2:
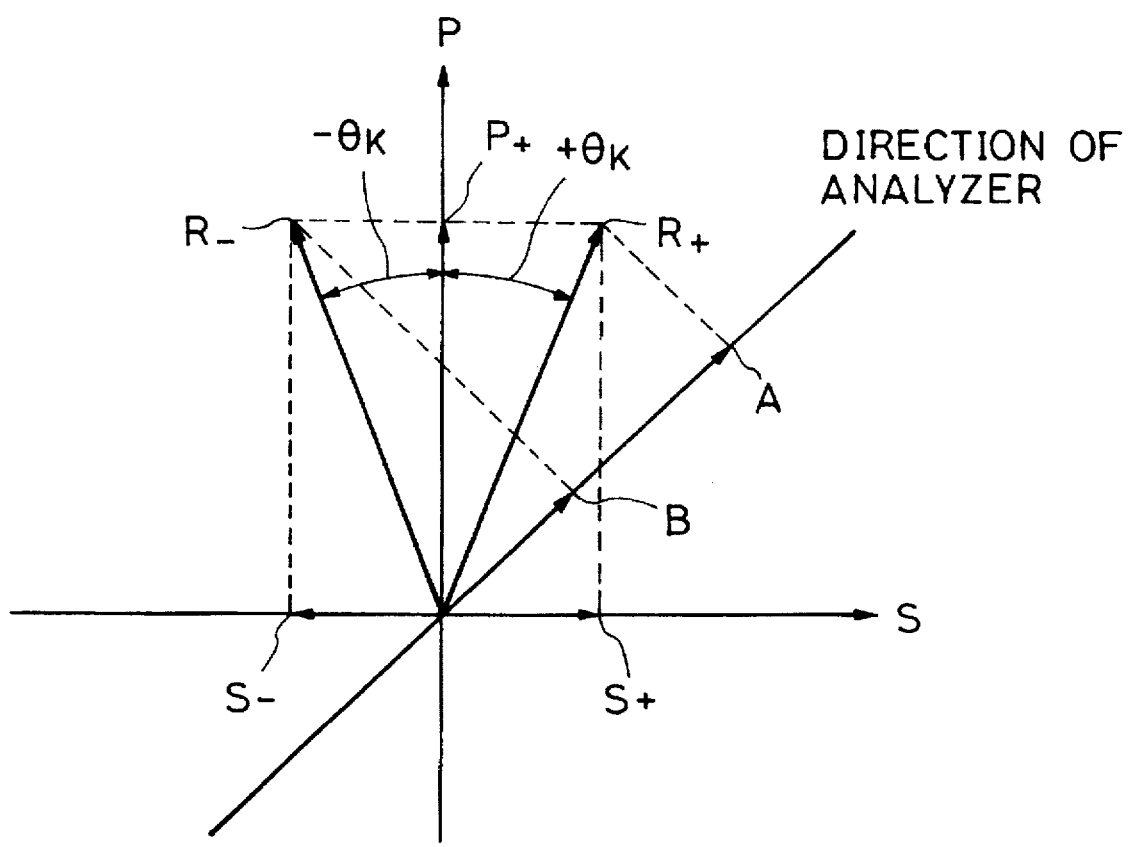
FIG. 2 illustrates the detection of a magneto-optical signal.
Figure 3:
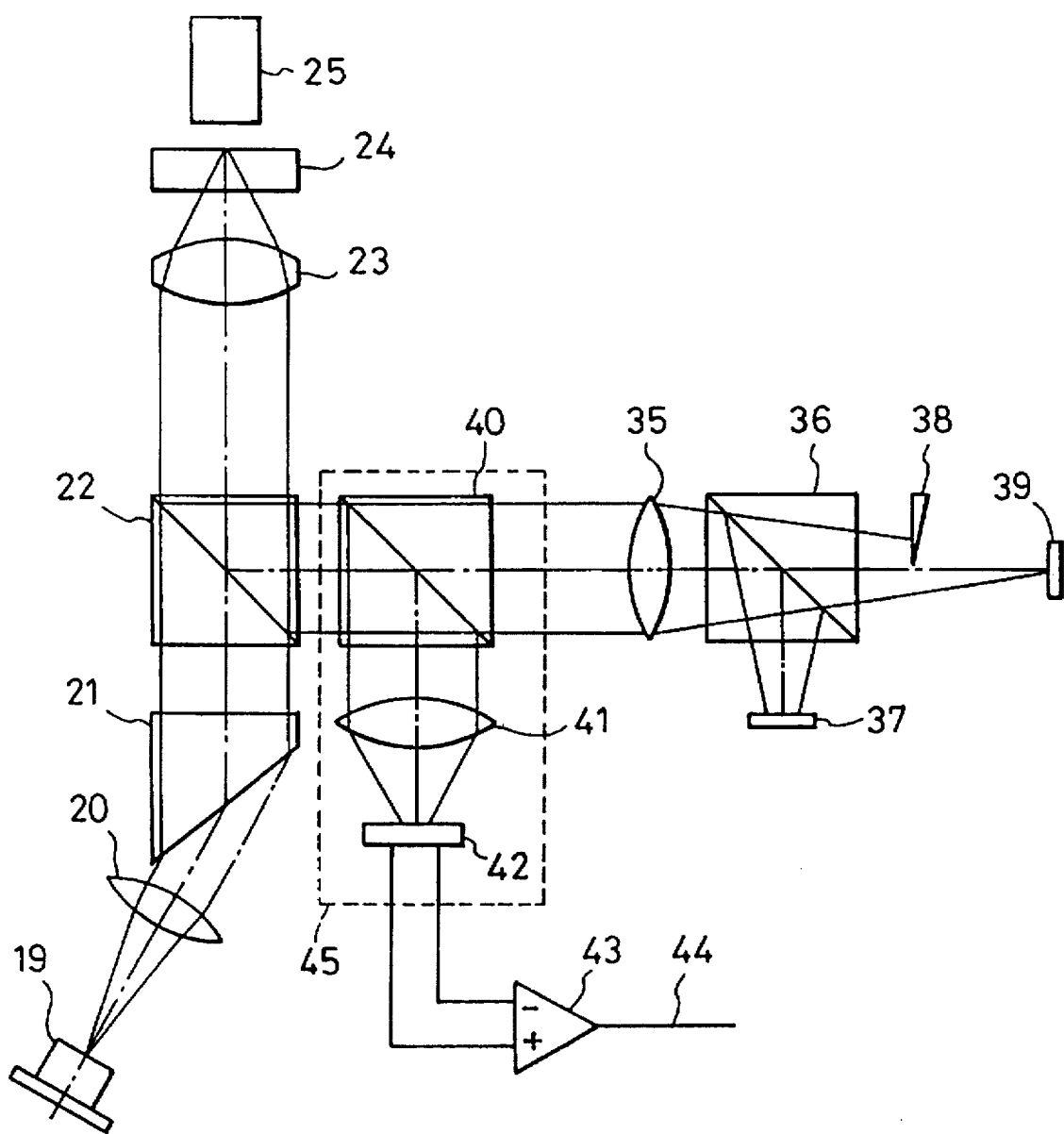
FIG. 3 is a schematic view of an optical head for use in a reproducing method in which a reproducing signal is obtained by use of light diffracted on a curved surface of an objective.
Figures 4A, 4B:
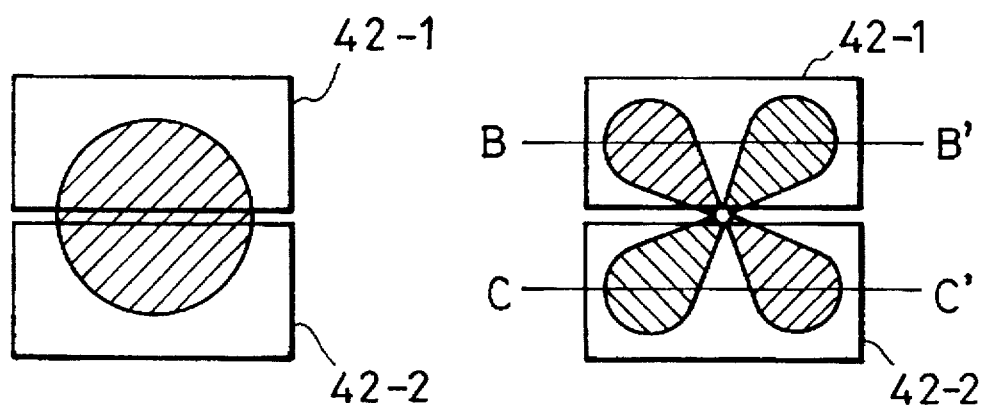
FIGS. 4A and 4B, illustrate the distribution of light on a photodetector.
Figures 5A, 5B:
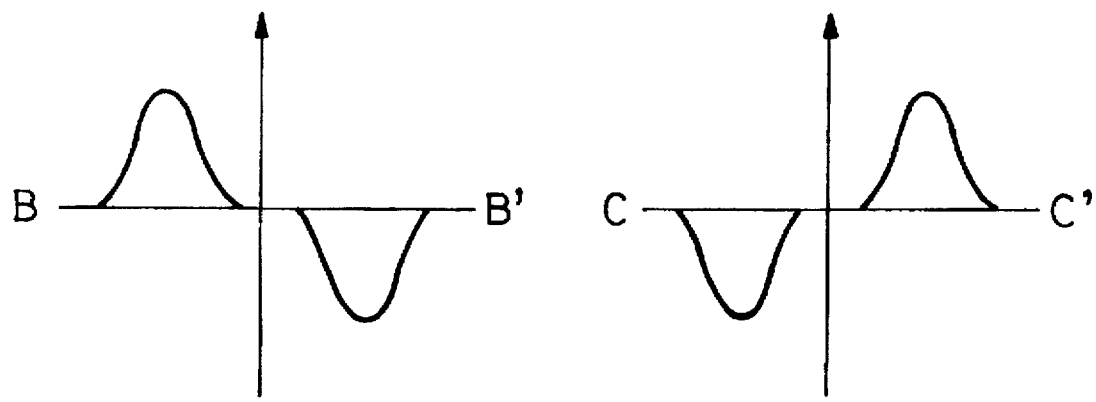
FIGS. 5A and 5B illustrate the amplitudes of light along the line B-B' and the line C-C' of FIGS. 4A and 4B, respectively.
Figure 6A:
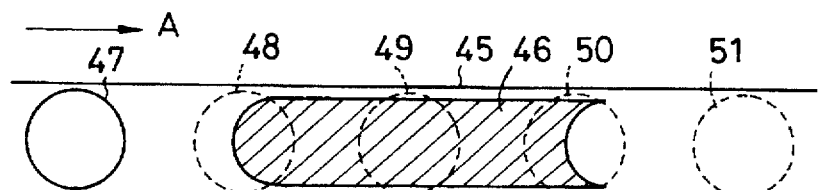
FIGS. 6A to 6F, illustrate the information reproducing method employed in the optical head shown in FIG. 3.
Figure 6B:
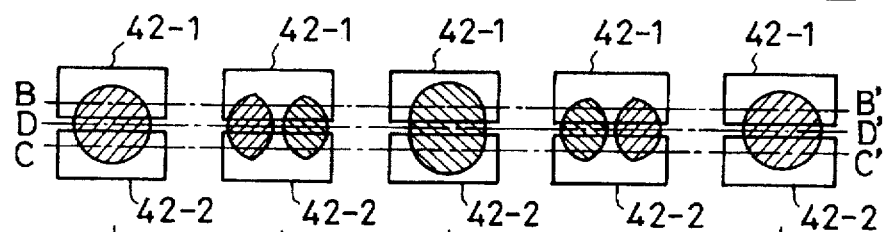
Figure 6C:
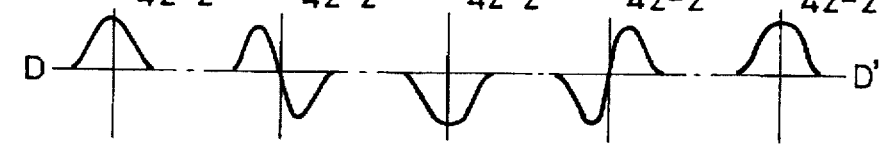
Figure 6D:
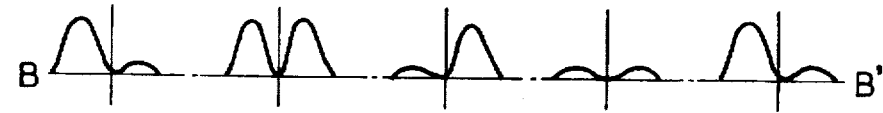
Figure 6E:
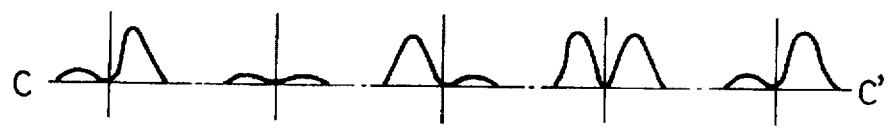
Figure 6F:
Figure 7:
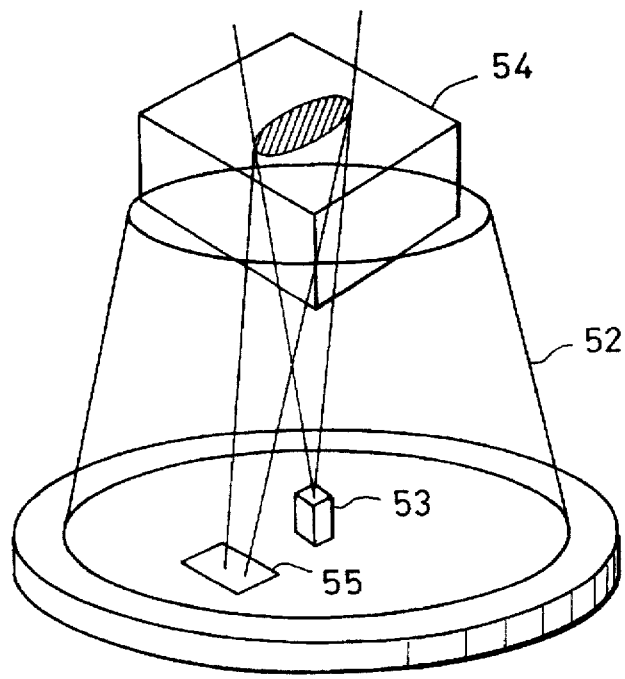
FIG. 7 is a schematic view of a semiconductor laser loaded with an error-signal detecting function.
Figure 8:
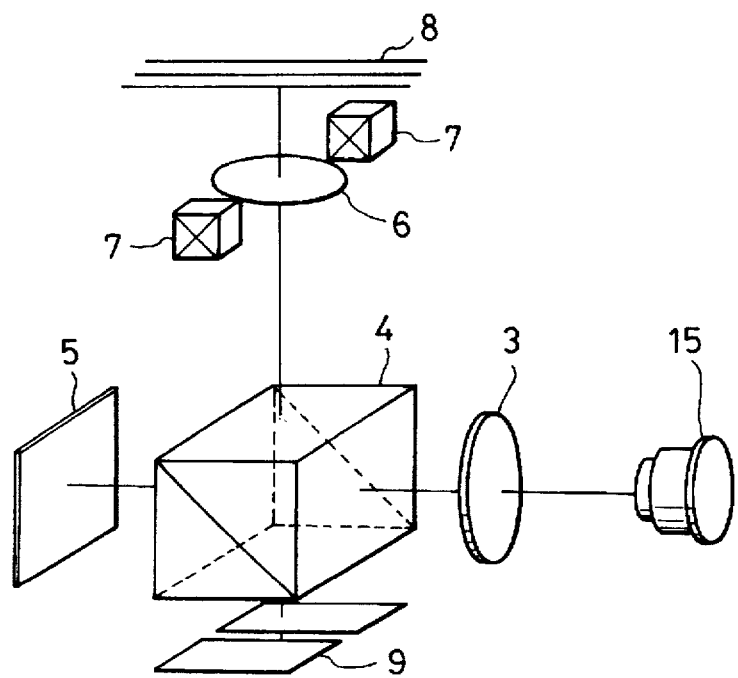
FIG. 8 is a schematic view of a conventional optical head.
Figure 9:
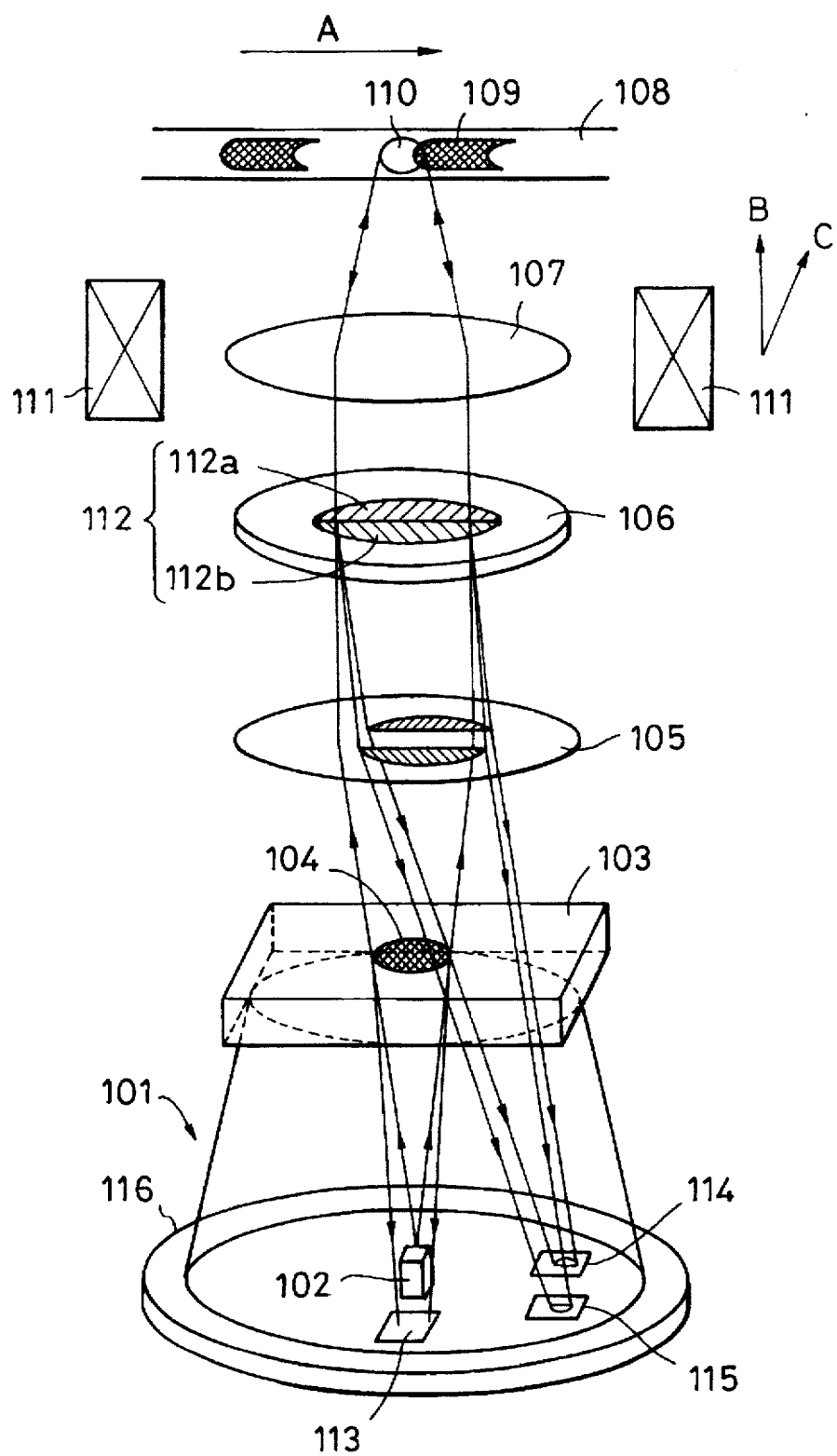
FIG. 9 is a schematic view of an embodiment of an optical head according to the present invention.

A detailed description will now be given of an embodiment of an optical head according to the present invention with reference to the drawings. FIG. 9 is a schematic view of an embodiment of an optical head according to the present invention. A semiconductor laser apparatus generally designated by 101 has detection means for detecting error signals used for auto-focusing and auto-tracking operations and photodetectors for reproducing information recorded on a magneto-optical disk. The apparatus 101 includes a semiconductor laser chip 102 used as a light source, a multi-division photodetector 113, which serves as error-signal detection means used for auto-focusing and auto-tracking operations, photodetectors 114 and 115 for reproducing information, wherein the laser chip 102, the multi-division photodetector 113 and the information-reproducing photodetectors 114 and 115 are mounted on a common substrate 116. Mounted on a transparent cover 103 is a hologram 104 serving as a light-separating hologram device.

It will now be assumed that the linear polarized light components orthogonal to each other are referred to as p-polarized light and s-polarized light. A light beam emitted from the semiconductor laser chip 102 is determined to be p-polarized light. The characteristics of the hologram 104 are, for example, to transmit approximately 80% of light and diffract approximately 20% of the light, whereby the light can be separated. Accordingly, the light emitted from the laser chip 102 mostly passes through the hologram 104. The light passing through the cover 103 is formed into a collimated beam through a collimator lens 105 and reaches a polarized-light separating hologram device 106. A hologram 112 is formed on the hologram device 106 whose ideal characteristics are to completely transmit p-polarized light and to diffract s-polarized light so as to separate the beam.

The hologram 112 is comprised of two separation surfaces 112a and 112b. The split line between the separation surfaces 112a and 112b is oriented to be parallel to an information track 108 on a magneto-optical disk, as indicated by the arrow A in FIG. 9. With this arrangement, the beam from the collimator lens 105 passes through the hologram 112 of the separating hologram device 106. The beam further passes through an objective 107 and forms a miniscule spot 110 on the information track 108 of the magneto-optical disk. A magnetic domain 109 is formed on the track 108. The arrow A is in parallel to the track 108 on the disk. Drive coils 111 are used for performing auto-focusing (in the direction indicated by the arrow B) and auto-tracking (in the direction indicated by the arrow C), respectively.

The reflected light from the disk 108 is again formed into a collimated beam passing through the objective 107 and returns to the hologram device 106. Since the hologram device 106 has the above-described construction and characteristics, p-polarized light of the reflected light from the magneto-optical disk completely passes through the hologram device 106, and returns to the hologram 104 mounted on the cover 103 through the collimator lens 105. Since the hologram 104 has the above-described characteristics, the p-polarized light is partially diffracted and separated by the hologram 104 and is guided to the multi-division photodetector 113 in which error signals for auto-focusing and auto-tracking operations are detected, as has been explained with reference to FIGS. 3 to 8.

Figure 10:
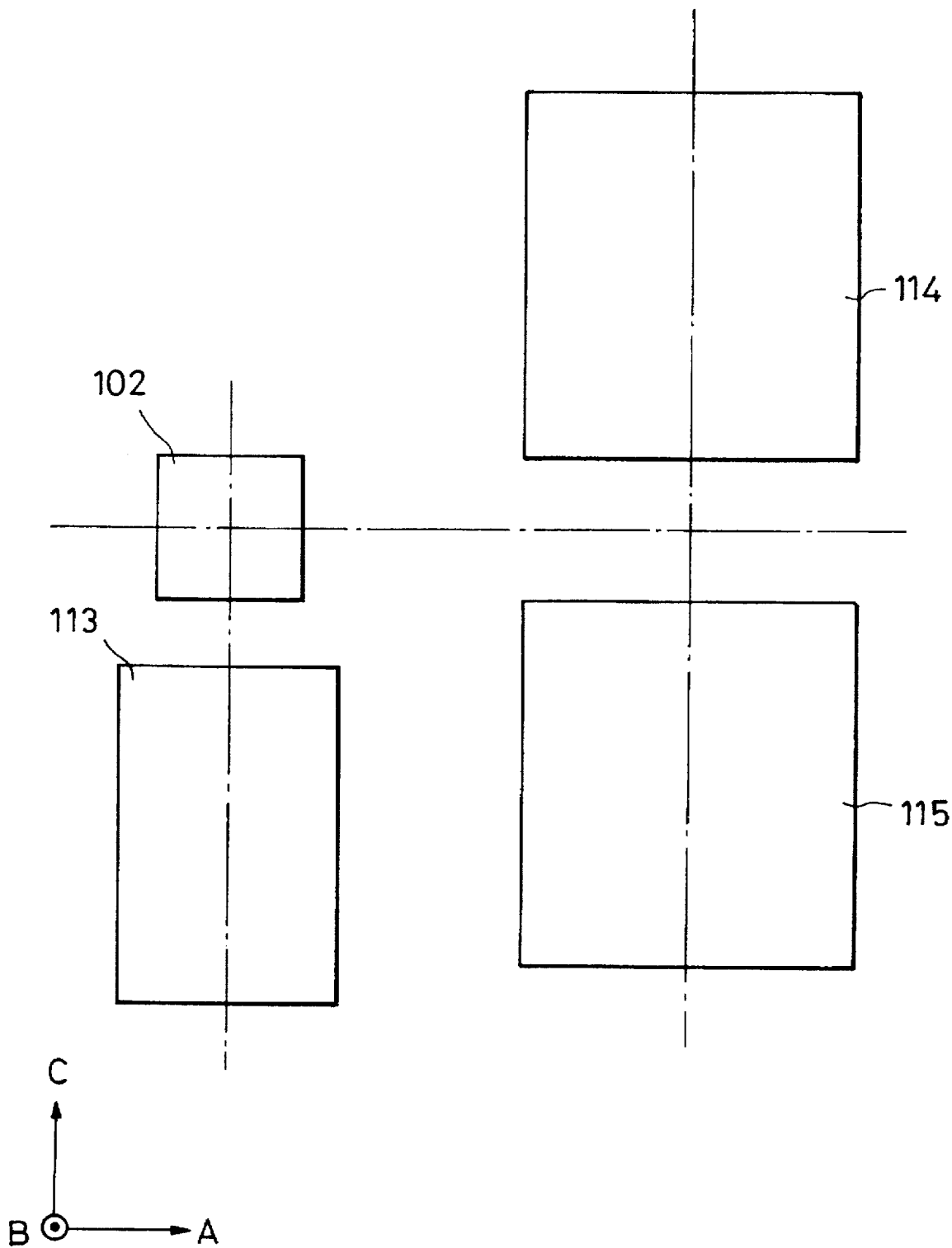
FIG. 10 is a schematic diagram of the arrangement of a semiconductor laser chip and photodetectors for use in a semiconductor laser apparatus.

On the other hand, the s-polarized light of the reflected light from the disk is diffracted and separated from the p-polarized light by the hologram 112 so as to be formed into two beams. The two s-polarized beams pass through the collimator lens 105 and the cover 103 and are guided to the photodetectors 114 and 115, respectively. The beam separated on the hologram separation surface 112a is guided to the photodetector 114, while the beam separated on the surface 112b is guided to the photodetector 115. The signal detected on the photodetector 114 corresponds to the signal on one detection surface (for example, 42-1) of the photodetector shown in FIG. 6, while the signal detected on the photodetector 115 is comparable to the signal on the other detection surface (for example, 42-2). Thus, the signals detected on the respective photodetectors 114 and 115 are differentiated, thereby obtaining a signal having a peak in the positive or the negative direction only at an edge portion of the magnetic domain 109, as has been discussed with reference to FIG. 6. Information recorded on the magneto-optical disk can be reproduced by detecting the above-mentioned peak of the signal. In consideration of the quality of the reproducing signal, it is preferable that the beams do not pass through the hologram 104 on the cover 103. Also, for inhibiting an adverse influence of the ghost light of the individual holograms 104 and 112, it is desired that the separating direction of the hologram 104 not coincide with that of the hologram 112. In this embodiment, as shown in FIG. 10, the separating directions of the individual holograms 104 and 112 are selected so that the line connecting the laser chip 102 and the multi-division photodetector 113 can be located at approximately 90 degrees with respect to the line connecting the laser chip 102 and the mid-point between the photodetectors 114 and 115.

Further, in consideration of the adverse influence of the deviation of a beam caused by the tracking operation, the objective 107 and the hologram device 106 may be driven at the same time to control tracking and focusing. For exercising this control, considering a deviation of a beam caused by the tracking operation, it is preferable that the photodetectors 114 and 115 be sufficiently elongated in the tracking direction indicated by the arrow C. Also, considering an adverse effect of variations in the wavelength of a light source, it is preferable that the dimensions of the photodetectors 114 and 115 in the direction A be adequately elongated, and that the dimensions of the individual detection surfaces of the multi-division photodetector 113 in the direction C are also sufficiently elongated.

According to the embodiment discussed above, the information-reproducing photodetectors 114 and 115 are built into the semiconductor laser apparatus 101, thereby achieving a smaller and lighter optical head. Further, the photodetector 113 for auto-focusing and auto-tracking operations are also contained in the apparatus 101, thereby making the optical head even smaller and lighter.

The present invention includes the following modification. A hologram having a function similar to that of the hologram 104 may be formed on the polarized-light separating hologram device 106 of this embodiment, and a hologram having a function similar to that of the hologram 112 provided with the hologram device 106 may be mounted on the cover 103 of the semiconductor laser apparatus 101.

As will be clearly understood from the foregoing description, the present invention offers the advantage of providing a compact and lightweight optical head.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical head comprising:

a light source;

an objective for applying a light beam from said light source to an optical recording medium in the form of a spot;

a polarized-light separating hologram device for separating a first light beam portion from a light beam reflected from said optical recording medium, said first light beam portion having only a polarized-light component in the polarizing direction orthogonal to the polarizing direction of the light beam travelling to said objective from said light source; and an information-reproducing photodetector for detecting said first light beam portion separated by said polarized-light separating hologram device.

2. An optical head according to claim 1, wherein said optical recording medium is a magneto-optical recording medium.

3. An optical head according to claim 1, wherein said polarized-light separating hologram device comprises two polarized-light separating surfaces, the direction of the split line between said two polarized-light separating surfaces corresponds to the information track direction of said optical recording medium, and said information-reproducing photodetector comprises two detection surfaces, portions of a light beam separated on said two polarized-light separating surfaces being guided to said two detection surfaces, respectively.

4. An optical head according to claim 1, further comprising:

a separating hologram device for separating a second light beam portion, which is different from said first light beam portion, from the light beam reflected from said optical recording medium; and a control signal photodetector for detecting said second light beam portion separated by said separating hologram device.

5. An optical head according to claim 4, wherein said control signal photodetector is a photodetector for auto-focusing and auto-tracking operations.

6. An optical head according to claim 4, wherein a light beam component passing through said polarized-light separating hologram is guided to said separating hologram device, said light beam component being part of the light beam reflected from said optical recording medium.

7. An optical head according to claim 4, wherein said control signal photodetector is located within a light source unit containing said light source.

8. An optical head according to claim 4, wherein said control signal photodetector is formed on a common substrate on which said light source is formed.

9. An optical head according to claim 4, wherein a light source unit containing said light source comprises a transparent cover through which the light beam travels to said objective from said light source.

10. An optical head according to claim 9, wherein one of said polarized-light separating hologram device and said separating hologram device is formed on said transparent cover.

11. An optical head according to claim 4, wherein said light source, said information-reproducing photodetector and said control signal photodetector are located in such a manner that they are not in line with each other.

12. An optical head according to claim 1, wherein said information-reproducing photodetector is disposed within a light source unit containing said light source.

13. An optical head according to claim 1, wherein said information-reproducing photodetector is formed on a common substrate on which said light source is formed.

14. An optical head according to claim 1, wherein a light source unit containing said light source comprises a transparent cover through which the light beam travels to said objective from said light source.

15. An optical head according to claim 1, wherein said polarized-light separating hologram device transmits p-polarized light and diffracts s-polarized light so as to separate a beam, when the beam is regarded as p-polarized light directed to said objective from said light source.

* * * * *

UNITED STATES PATENT AND TRADEMARK OFFICE
CERTIFICATE OF CORRECTION

PATENT NO. : 5,717,675
DATED : February 10, 1998
INVENTOR(S) : Yamamoto

Page 1 of 2

It is certified that error appears in the above-identified patent and that said Letters Patent is hereby corrected as shown below:

On the title page item [56]:

FOREIGN PATENT DOCUMENTS

"5274733" should read --5-274733--; and
7169129" should read --7-169129--.

COLUMN 2:

Line 39, "U.S. Patent No. 012453," should read --U.S. Patent Application No. 08/012,453--.

COLUMN 3:

Line 37, "4B" should read --4B,--.

COLUMN 5:

Line 15, "(and" should read --(Japanese Patent Laid-Open No. 7-169129, and--, and "U.S. Patent No. 352227," should read --U.S. Patent Application No. 08/352,227--.

UNITED STATES PATENT AND TRADEMARK OFFICE
CERTIFICATE OF CORRECTION

PATENT NO. : 5,717,675

DATED : February 10, 1998

INVENTOR(S) : Yamamoto

It is certified that error appears in the above-identified patent and that said Letters Patent is hereby corrected as shown below:

COLUMN 7:

```
Line 15, "4B," should read --4B--; and
Line 20, "6F," should read --6F--.
```

Signed and Sealed this

First Day of September, 1998

Attest:

BRUCE LEHMAN

Attesting Officer

Commissioner of Patents and Trademarks